R. H. BOWEN.
METAL PULLEY AND PROCESS FOR THE MANUFACTURE THEREOF.
APPLICATION FILED JUNE 12, 1918.
1,308,035.
Patented July 1, 1919.
2 SHEETS—SHEET 1.
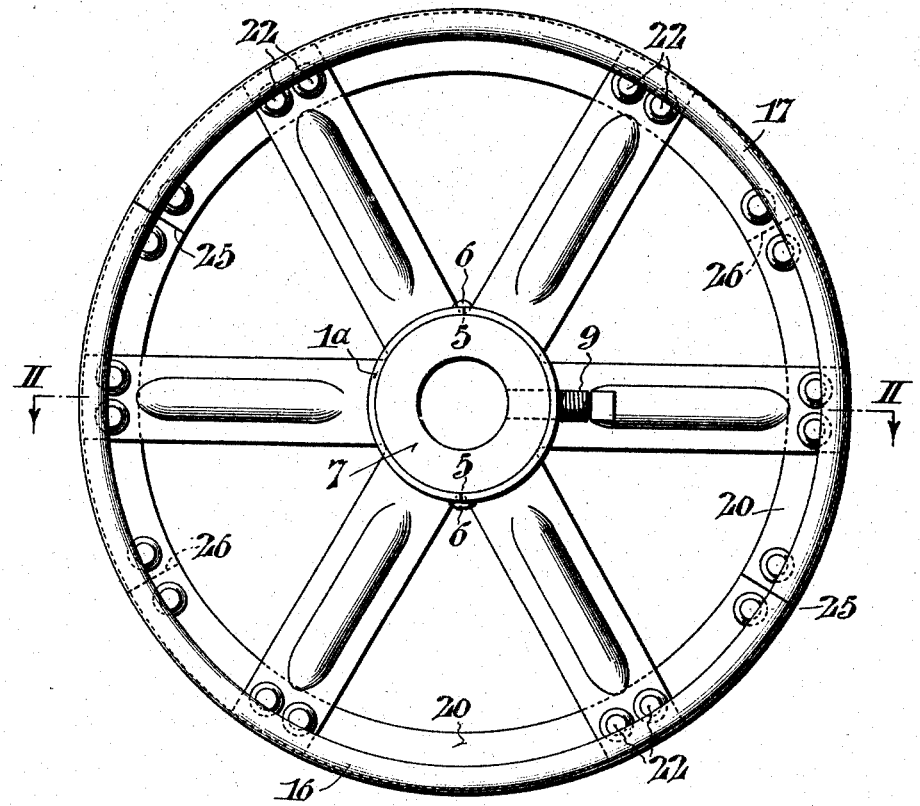
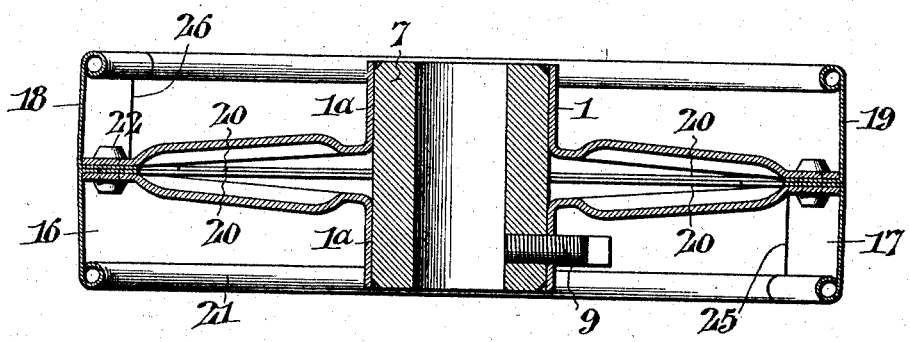
Inventor
Russell H. Bowen, R. H. BOWEN.
METAL PULLEY AND PROCESS FOR THE MANUFACTURE THEREOF.
APPLICATION FILED JUNE 12, 1918.
1,308,035.
Patented July 1, 1919.
2 SHEETS—SHEET 2.
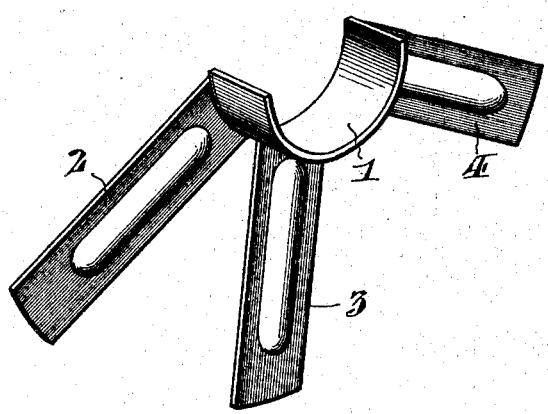
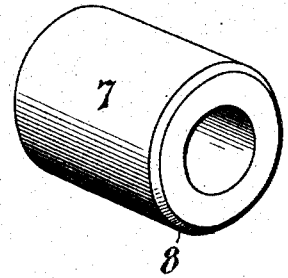
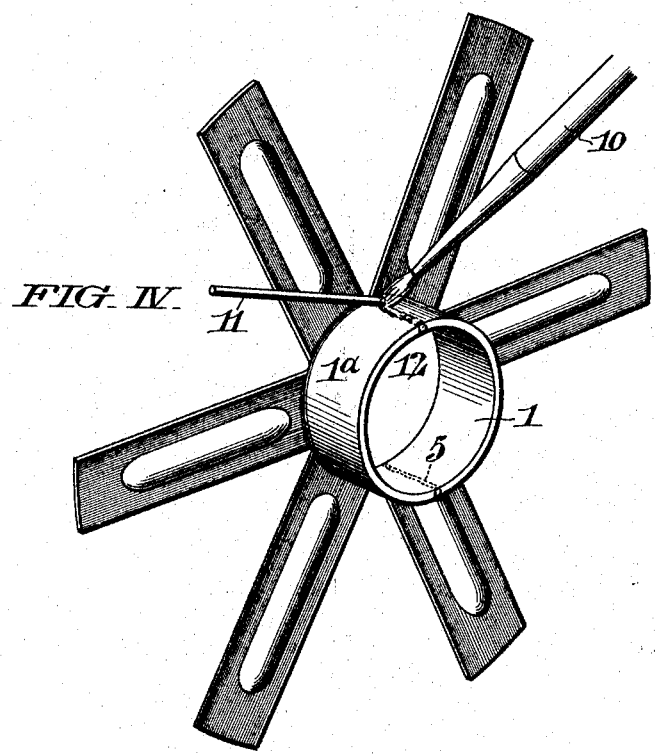
Witnesses
Inventor
Russell H. Bowen,
By Maly & Paul
Attorneys

UNITED STATES PATENT OFFICE.

RUSSELL H. BOWEN, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

METAL PULLEY AND PROCESS FOR THE MANUFACTURE THEREOF.

1,308,035. Specification of Letters Patent. Patented July 1, 1919.

Application filed June 12, 1918. Serial No. 239,535.

*To all whom it may concern:*

Be it known that I, RUSSELL H. BOWEN, of Philadelphia, in the county of Philadelphia and State of Pennsylvania, have invented certain new and useful Improvements in Metal Pulleys and Processes for the Manufacture Thereof, whereof the following is a specification, reference being had to the accompanying drawings.

My invention relates to pulleys formed mainly from pressed metal, and the object is to provide a process whereby "whole" pulleys of this character, when of relatively small diameter, may be constructed with great economy, and without the sacrifice of strength or other desirable qualities, the organization, which is the product of said process, being in itself novel and highly desirable.

In the drawings, Figure I, represents a view in side elevation of a finished pulley embodying my invention.

Fig. II, is an axial section thereof on the line II, II, of Fig. I.

Fig. III, is a view in perspective of one of the so-called "spiders" which constitute important members of the pulley structure, and which, in the process of manufacture are integrally united to one another in pairs, two of such pairs being applied to the hub in a peculiar manner.

Fig. IV, is a diagrammatic view in perspective, illustrating the step of the process whereby the two members of a pair of spiders are integrally united.

Fig. V, is a view of the hub member.

As heretofore constructed, certain types of pressed metal pulleys (usually of the class known as "split-pulleys") have been composed of four so-called "spiders" each of which comprises a semi-annular band of metal, adapted to be applied upon the exterior of the hub member, and a plurality of spoke-arms, arranged in a general plane substantially radial to the axis of the semi-annular hub-band, two of such spiders being mechanically attached to one another, side by side, with their respective spoke arms in alined juxtaposition, the ends of the composite spokes being secured to a semi-annular pulley rim. The structure thus formed constitutes a "half-pulley", which in turn was secured to a similarly formed half-pulley, by proper connecting elements, to complete the total circumference of the pulley.

The object of the present invention is to utilize spiders of this general character, in cases where the finished pulley is to be of relatively small diameter, but to employ them in a different relative arrangement from that above described, and to that end to provide a process whereby the hub-bands of a pair of spiders constituting one face of the entire pulley, may be integrally united, to form a hub-annulus of sufficient tensile strength to permit its forcible application upon a metallic hub member, the hub annulus and preferably the spoke-arms being in alined juxtaposition, with corresponding parts of another pair of similarly united spiders (constituting the other face of the pulley structure), a rim element or elements being subsequently applied to each complete pair of spiders.

Referring to Fig. III, of the drawings, 1, represents the semi-annular hub-band of a spider, from which the spoke-arms 2, 3, and 4, project radially.

The first step of my process is addressed toward integrally uniting the hub-bands of two such spiders, (to form an element constituting one face of the pulley), by means of a fused metallic joint, of such character that the portions of the complete hub-annulus which lie along the regions of union, shall have greater tensile strength than the residual portions of the band.

I prefer to obtain this union by the use of a fusing device, such as an acetylene torch 10, (see Fig. IV), whereby fused metal from an extraneous source, such as a piece of metal wire 11, is flowed in between the two abutted ends of the hub-bands 1, and 1ª, and is integrally incorporated with the metal of each band by commingling in a fused state, as indicated in a somewhat exaggerated manner at the point 12, in Fig. IV.

The fusing operation should be so conducted as to deposit a small excess of metal at this region which ordinarily will be manifest by a slight protuberance upon the exterior surface, as indicated at 6, (see Fig. II), care being taken to prevent substantial intrusion of metal beyond the interior surface of the annulus at the regions of union 5.

Two pairs of spiders, thus united, are placed with their annular hub-bands, in alined juxtaposition, and a hub 7, (see Fig. V), preferably of cast metal and having a slight taper at the extremity as indicated at 8, is forced by hydraulic pressure or otherwise, into the cylindrical cavities formed by the union of the respective hub-bands, the external diameter of the hub member 7, being slightly in excess of the original internal diameter of the cavities, so that the metal of each annulus is stretched to a point within its elastic limit, to clamp the hub under permanent expansive tension. It will be noted that for such procedure it is desirable that the metal at the internal joints between the hub-band members of each pair of spiders shall possess a tensile strength which is not less than, and preferably exceeds, that of the residual portions of the annulus, so that there shall be no danger of rupture or weakening, at the regions of union, under the strain.

I then form a threaded radial hole through a hub annulus and subjacent portion of the hub member to receive a set screw 9, of the usual character for attachment of the pulley to the shaft.

The rim of the pulley, is then applied to the ends of the now completed spoke members. In the instance shown, the total rim consists of four semi-annular bands 16, 17, 18, and 19, each having an inwardly projecting radial flange, such as 20, extending along one edge and a bead such as 21, extending along the other edge. The radial flanges are inserted side by side, between the outer ends of the spoke arms, and riveted thereto as shown at 22; the joints of the respective pairs of rim portions being arranged out of alinement, as indicated at 25, and 26.

I use the term "whole-pulleys", in my claims, as comprehending not only pulleys, in the ordinary sense of that term, but also wheels.

Having thus described my invention, I claim:

1. The hereinbefore described improvement in the process of making whole pulleys, which consists in integrally uniting the abutted ends of the semi-annular hub bands of a pair of spiders, by flowing fused metal into the aperture between them, and incorporating said metal with the metal of the bands, while building up an external excess of metal, sufficient to afford tensile strength at the region of union as great as that of the residual portions of the annulus thus formed; arranging the pair of united spiders with its hub annulus in alined juxtaposition with the hub-annulus of a pair of similarly united spiders; forcing into the cavities of the alined hub-annuli a metallic hub member of greater external diameter than the interior diameter of the cavity, and thereby stretching the metal of each annulus to produce a compressively clamped joint with the hub member; and applying rim members to the extremities of the composite spoke members, substantially as set forth.

2. The hereinbefore described improvement in whole pulleys, comprising two separate, but individually complete oppositely-facing elements, each composed of two metallic spiders whose hub bands are integrally united at their abutted ends by an integrally welded joint; a metallic hub member clamped in position by the metal of each hub-band annulus under expansive tension; and rim members secured to extremities of the spoke members.

3. The hereinbefore described improvement in whole pulleys, comprising two separate, but individually complete oppositely-facing elements, each composed of two metallic spiders whose hub bands are integrally united at their abutted ends by a joint having a tensile strength not less than that of the residual portions of the annulus, the hub annulus of one facing element being arranged in alined juxtaposition with those of the other; a metallic hub member clamped in position by the metal of each annulus under expansive tension; and rim members secured to the extremities of the spoke members.

In testimony whereof I have hereunto signed my name at Philadelphia, Pennsylvania, this 6th day of June, 1918.

RUSSELL H. BOWEN.

Witnesses:
JOSEPH T. HILL,
CHARLES C. VAN ARTSDALEN.

Copies of this patent may be obtained for five cents each, by addressing the "Commissioner of Patents, Washington, D. C."